United States Patent [19]

Slusarczuk

[11] 3,928,220

[45] Dec. 23, 1975

[54] PREPARATION OF HYDROCARBON-DISPERSIBLE MAGNETIC MICROSPHEROIDS IN POWDERED FORM

[75] Inventor: George M. J. Slusarczuk, Schenectady, N.Y.

[73] Assignee: General Electric Company, Schenectady, N.Y.

[22] Filed: Aug. 27, 1973

[21] Appl. No.: 391,580

[52] U.S. Cl............ 252/62.62; 75/.5 AA; 148/105; 252/62.56; 423/594; 427/127
[51] Int. Cl.²...................................... C04B 35/26
[58] Field of Search.......... 75/.5 AA, .5 A; 148/105; 252/62.62, 62.51, 62.52, 62.54, 62.56; 423/594, 592; 117/119.6, 234, 235; 34/9, 95; 106/308 B, 308 F

[56] References Cited
UNITED STATES PATENTS

| | | | |
|---|---|---|---|
| 2,917,400 | 12/1959 | Edwards | 106/308 F |
| 3,228,882 | 1/1966 | Harle et al. | 252/62.51 |
| 3,492,235 | 1/1970 | Matsumoto et al. | 252/62.54 |
| 3,520,811 | 7/1970 | Swoboda | 252/62.54 |
| 3,634,030 | 1/1972 | Balthis et al. | 252/62.51 |
| 3,676,217 | 7/1972 | Akashi et al. | 252/62.54 |
| 3,700,499 | 10/1972 | Haack et al. | 117/235 |
| 3,700,595 | 10/1972 | Kaiser | 252/62.56 |
| 3,736,500 | 5/1973 | Berkowitz et al. | 252/62.51 |

FOREIGN PATENTS OR APPLICATIONS 1,058,426  2/1967  United Kingdom................. 117/234

OTHER PUBLICATIONS

Kirk-Othmer; *Encyclopedia of Chemical Technology*, 5, New York, 1950, p. 277 and Vol. 6, pp. 267–268.

Kolthoff, I., et al., *Textbook of Inorganic Analysis*, New York, 1946, p. 118.

*Primary Examiner*—Walter R. Satterfield
*Attorney, Agent, or Firm*—Jane M. Binkowski; Joseph T. Cohen; Jerome C. Squillaro

[57] ABSTRACT

An aqueous colloidal solution of magnetic material stable in magnetic fields and magnetic field gradients and prepared by known methods (e.g. hydrothermal preparation of ferrites) is mixed with an excess of fatty acid or lipophilic surfactant and vigorously stirred to bring about separation of the water from the residue that is formed. The residue is then taken up in a hydrocarbon solvent and separated from any residual water. If desired, this product can then be reduced to a dry powder that retains its property of colloidal dispersibility for ready resuspension in a liquid hydrocarbon.

5 Claims, No Drawings

3,928,220

PREPARATION OF HYDROCARBON-DISPERSIBLE MAGNETIC MICROSPHEROIDS IN POWDERED FORM

BACKGROUND OF THE INVENTION

Stable colloidal dispersions of magnetic microspheroids have been prepared both in aqueous media and in oil. The resulting magnetic fluids have been employed in a wide variety of uses, including the tagging of various liquids (e.g. oil and oil products) as is described in U.S. Pat. No. 3,735,500 - Berkowitz et al (incorporated by reference). The preparation of magnetic fluids by which colloidal magnetic particles are first prepared in an aqueous medium and then transferred to a non-aqueous phase is described in "Preparing Magnetic Fluids By A Peptizing Method" by G. W. Reimers and S. E. Khalafalla (Bureau of Mines, Technical Progress Report - 59, September 1972). As is stated on page 12 of this report, "Dispersing agent concentration must be held within a certain range; too little limits the quantity of magnetic colloid extracted, and excessive amounts cause coagulation of the magnetic particles." The dispersing agents employed by the authors were the fatty acids of the $C_{18} H_{30-34} O_2$ group. It is well known that normally, when a colloid is dried, its colloidal properties are destroyed. There is no discussion in the Bureau of Mines report relating to the preparation of any dry powdered material from the magnetic fluid, particularly a powder that retains its colloidal properties, exhibiting such properties upon being redispersed in a liquid hydrocarbon.

DESCRIPTION OF THE INVENTION

This invention relates to the preparation of an improved magnetic colloid material in either of two product forms: suspended in a hydrocarbon solvent or reduced to a dry powder. The dry powder retains its colloidal properties and may be readily redispersed in a liquid hydrocarbon such that a very high percentage of the redispersed product does not settle out, even after standing for a period of several weeks.

According to the invention, aqueous colloidal solutions of magnetic materials prepared by various methods (e.g. by hydrothermal techniques) may be transferred to a non-aqueous phase and, if desired, reduced to a dry powder dispersible in a liquid hydrocarbon. This transfer is accomplished by mixing the desired volume of aqueous colloidal solution with an excess of fatty acid or lipophilic surfactant and vigorously stirring as required to bring about the separation of substantially all the water from the residue that is formed. This residue is then taken up in a hydrocarbon solvent and is separated from any residual water resulting in a product suitable for use. A dry powdered form best suited for storage and shipping may be prepared by the addition of a polar solvent thereto to precipitate the colloidal magnetic material, centrifuging, re-suspending the precipitate in a hydrocarbon solvent, re-precipitating, re-centrifuging and then drying the precipitate and crushing any lumps therein.

When dispersed in a liquid hydrocarbon, the magnetic colloid may be employed as an identification tag for oil, for example. As described in the Berkowitz et al patent, it is merely necessary to distribute the tagging colloid in the oil. Identification can be made using the inherent magnetic (Curie point), chemical (composition) and structural (lattice perimeter) properties of the particular magnetic material.

Fatty acids useful in the practice of this invention are those that are liquid at the processing temperature and non-drying, that is, these materials are not polymerized on exposure to air at the processing temperature. Lipophilic surfactants include such materials as Tenlo 70 (Noper Chemical), Tritons (Emulsion Engineering Inc.) and Enjay-3584, manufactured by Enjay Chemicals Company. Commercially obtainable fatty acids are more conveniently employed, and are more economical, than pure fatty acids. Thus, commercial oleic acid may contain (in addition to oleic acid) trace quantities and small quantities of such fatty acids as lauric, myristic, pentadecanoic, palmitic, margaric, stearic, myristoleic, palmitoleic, linoleic and linolenic acids. Commercial linoleic acid is predominantly linoleic with a significant (about 25–30 per cent) concentration of oleic plus traces or small quantities of the other fatty acids listed hereinabove.

The surfactants (i.e. fatty acid of lipophilic surfactant) employed in the practice of this invention serve to protect the colloidal nature of the particles (first manifested in the aqueous phase) for the transistion to the non-aqueous phase. Thus, the magnetic colloidal particles should be coated with at least a monomolecular layer of surfactant which exhibits an affinity to the liquid in which the particles are suspended. A significant excess of surfactant is provided by taking a volume of the fatty acid or lipophilic surfactant equal to the volume of aqueous colloid regardless of the actual colloidal magnetic particle concentration.

Suitable hydrocarbon solvents include, by way of example, hexane, kerosene, benzene, naphtha, etc. Precipitating agents include, by way of example, acetone, methanol and other polar solvents miscible with hydrocarbons.

The size of the magnetic particles forming the colloid preferably range from about 50 to about 500A, although particle sizes ranging to at least about 800A may be employed.

Suitable magnetic materials include oxides, such as, for example, ferrites, perovskites, chromites and magnetoplumbites. Also, ferromagnetic, ferrimagnetic, superparamagnetic and other magnetic materials are useful in the practice of this invention.

Ferrites enumerated on pages 4–36 of Reference Data For Radio Engineers (Howard W. Sams and Company, Inc., 5th Edition, Library of Congress Catalog No. 43–14665) are exemplary and include such materials as $NiFe_2O_4$, $Ni_xZn_{(1-x)} Fe_2O_4$ where $x$ varies from zero to one, $MnFe_2O_4$, $Mn_xZn_{(1-x)} Fe_2O_4$ where $x$ varies from zero to one, $CuFe_2O_4$, $MgFe_2O_4$, $CoFe_2O_4$, etc.

When one or the other of the products of this invention is employed in the tagging of hydrocarbon liquids a concentration of magnetic particles of between about 1 to about 10 parts per million by weight in the liquid is suitable for subsequent collection and detection.

Other applications for the magnetic fluid of this invention is in pumps, bearings, seals, specific gravity meters, etc.

DESCRIPTION OF THE PREFERRED EMBODIMENT

Hydrothermally prepared ferrites are preferred for use in the practice of this invention, because of the ease of preparation thereof. Thus, a solution of metal salts is prepared from a ferric salt and the salt of divalent metals. The ratio of the salts is 2 moles of the ferric salt to 1 mole of the divalent metal salt, as for example, 2 moles of ferric chloride and 1 mole of zinc chloride. A quantity of this solution (as desired) is added to an excess of hot (at least about 90°C) alkali solution, e.g. NaOH, $NH_4$ OH. A precipitate results, that is permitted to stand for a period ranging from about 2 to about 20 hours at a temperature in excess of about 90°C. This aging step provides control over the size of the magnetic particles being developed.

After the aging step, the precipitate is washed with distilled water in order to remove entrained unused salt (from the starting solution) and alkali. The washing is carried past the point of peptization. This condition is easily recognizable, because the colloidal particles forming the precipitate being washed no longer settle. At this point, an aqueous colloid of the magnetic particles is produced. If desired, sonication may be employed to facilitate colloid particle dispersion.

The desired quantity of aqueous colloid is then mixed with oleic acid (commercial grade) using about equal volumes thereof. The mixture is vigorously stirred and after a short time separation begins, resulting in the formation of an oily layer and a supernatant clear aqueous layer. The supernatant is decanted and the stirring is continued to separate out more water as supernatant. Finally, when no more water is caused to separate by the stirring, the oily residue is taken up in a convenient hydrocarbon solvent, such as hexane.

The oily residue (containing the colloidal magnetic particles) taken up in the solvent can be separated from residual water (as by the use of a separatory funnel) and used in this form or it can be further processed for the production of dry powdered colloid material. This magnetic colloid material is not concentration sensitive, that is, the magnetic particles do not coagulate, when an excess of either oleic acid or hydrocarbon solvent is added to the magnetic fluid.

For the production of the dry powdered colloid, a volume of the oily residue/solvent system is added to twice that volume of acetone (or other polar solvent, such as methanol). The precipitate resulting from adding the acetone is then centrifuged and separated from the supernatant, which can be processed for the recovery of excess oleic acid.

The precipitate is then re-dissolved in hydrocarbon solvent and once again precipitated by the addition thereto of acetone. After centrifugation, the precipitate is dried in vacuo and any lumps are broken up in a mortar to produce a free-flowing powder. This powder is easily stored and shipped and can be readily dispersed in a very wide range of hydrocarbon liquids, not being limited in this respect by the presence of a given solvent.

Distribution of the powder in a hydrocarbon solvent is readily accomplished by adding the powder thereto and shaking. Dispersion of the magnetic colloid particles can be accelerated by the use of ultrasonication. The suspension is left to settle out overnight and the resulting supernatant, which will contain at least about 80 per cent of the magnetic colloid present in the powder addition is collected. The supernatant suspension is stable enough so that the colloidal particles do not settle therefrom even after standing for several weeks.

It is, of course, feasible to produce the powdered colloidal magnetic material by a single polar solvent addition followed by one isolation and subsequent drying of the precipitate providing only a very slight excess of surfactant (fatty acid, lipophilic surfactant or mixture thereof) is mixed with the aqueous colloidal solution. Simple settling of the precipitate (rather than centrifugation) may be employed, although this is more time-consuming. Also, the resulting precipitate/supernatant can be dried by merely permitting the polar and hydrocarbon solvents to evaporate without the application of a vacuum thereto.

The general method of this invention may, of course, be applied to the preparation of any colloidal powder dispersible in a hydrocarbon solvent, since magnetic properties are not required for successfully carrying out the steps of this process as defined in the following claims. When such non-magnetic colloidal powders are used as tagging agents for such materials as oils, the identification thereof may be by chemical composition, structure, radioactivity, etc.

What I claim as new and desire to secure by Letters Patent of the United States is:

1. The method for preparing colloidal magnetic ferrite particles ranging in size from about 50A to about 800A as a dry powder, said powder when mixed with a hydrocarbon solvent producing a substantially stable colloidal dispersion comprising the steps of:
   a. mixing a quantity of an aqueous colloidal dispersion of hydrothermally prepared magnetic ferrite particles ranging in size from 50A to about 800A with an excess amount of surfactant selected from the group consisting of non-drying fatty acids that are liquid and are not polymerized on exposure to air at ambient temperature, said surfactant when mixed with said aqueous colloidal dispersion being characterized by the property of forming an oily surfactant residue layer containing said colloidal magnetic ferrite particles and a supernatant clear aqueous layer,
   b. agitating the resulting mixture whereby an oily surfactant residue layer containing said colloidal magnetic ferrite particles forms wherein said particles are coated with at least a monomolecular layer of surfactant and a supernatant clear aqueous layer forms, and recovering said oily surfactant residue layer,
   c. mixing said recovered oily surfactant residue layer with hydrocarbon solvent whereby a colloidal dispersion forms, said hydrocarbon solvent having no significant deteriorating effect on the colloidal nature of said surfactant-coated ferrite particles,
   d. mixing the resulting hydrocarbon solvent colloidal dispersion with a polar solvent in an amount which percipitates said colloidal ferrite particles, said polar solvent being a liquid organic compound containing oxygen in the molecule and being miscible with said hydrocarbon solvent,
   e. recovering the resulting ferrite precipitate, and
   f. drying said ferrite precipitate producing a dried precipitate, said dried precipitate being a powdery mass which when mixed with said hydrocarbon solvent forms a substantially stable colloidal dispersion.

2. The method recited in claim 1 wherein the precipitate of step (e) is redispersed in said hydrocarbon solvent and reprecipitated by said polar solvent then followed by said drying of step (f).

3. The method recited in claim 1 wherein said recovering in step (e) is by centrifugation.

4. The method recited in claim 1 wherein the hydrocarbon solvent is hexane and the polar solvent is acetone.

5. The method recited in claim 1 wherein the surfactant is oleic acid.

* * * * *